(12) United States Patent
Ortscheid et al.

(10) Patent No.: US 6,208,734 B1
(45) Date of Patent: *Mar. 27, 2001

(54) HOLDING DEVICE FOR A COMMUNICATIONS UNIT

(75) Inventors: Annett Ortscheid, Bochum; Rainer Weber, Waldbronn, both of (DE)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,289

(22) Filed: Dec. 16, 1997

(30) Foreign Application Priority Data

Dec. 18, 1996 (DE) .................................. 196 52 826

(51) Int. Cl.[7] ........................................ H04M 1/00
(52) U.S. Cl. .................................... 379/446; 379/455
(58) Field of Search .......................... 379/446, 455, 379/454, 433, 434, 426

(56) References Cited

U.S. PATENT DOCUMENTS

| | | | |
|---|---|---|---|
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 R |
| 5,121,863 | 6/1992 | Kotitalo et al. | 224/42.45 R |
| 5,189,698 | 2/1993 | Hakanen | 379/455 |
| 5,597,102 | 1/1997 | Saarikko et al. | 224/197 |
| 5,832,082 | * 11/1998 | Nagai | 379/446 |
| 5,898,775 | * 4/1999 | Niemo et al. | 379/446 |

FOREIGN PATENT DOCUMENTS

| | | |
|---|---|---|
| 001 107 U1 | 10/1996 | (AT) . |
| 40 08 618 A1 | 9/1991 | (DE) . |
| 4008618 C2 | 9/1991 | (DE) . |
| 44 05 506 A1 | 8/1993 | (DE) . |
| 4405506 C2 | 8/1995 | (DE) . |
| 0 545 670 A2 | 6/1993 | (EP) . |
| 1-42965 | * 2/1989 | (JP) ............ 379/434 |

* cited by examiner

*Primary Examiner*—Jack Chiang
(74) *Attorney, Agent, or Firm*—Perman & Green, LLP

(57) ABSTRACT

A holding device (1) according to the invention for a communications unit (33, 36) contains a base element (2), a carrier (7) which is pivotably articulated on the base element (2), which can be pivoted away by means of spring force from the base element (2) and onto which the communications unit (33, 36) can be pushed with its one end against stop means (110), which hold the communications unit (33, 36), and a locking device (27), which is present on the base element (2) in order to lock the other end of the communications unit (33, 36) when the carrier (7) is pivoted towards the base element (2), the locking device (27) pressing the communications unit (33, 36) against the stop means (110).

24 Claims, 10 Drawing Sheets

HOLDING DEVICE FOR A COMMUNICATIONS UNIT

BACKGROUND OF THE INVENTION

1. Field of Invention

The invention relates to a holding device for a communications unit. The latter can be, for example, a mobile telephone or a handset of a mobile telephone system, which comprises this handset and a transceiver station connected to it, for example via a cable.

2. Prior Art

A holding device of the generic type for a communications unit is already generally known. However, it is not very user-friendly, nor operationally reliable.

DE 44 05 506 C2 has disclosed a holder for a mobile telephone, in which a pivotable carrier for a mobile telephone is fitted to a unshaped base element. The pivotable carrier has a baseplate, supporting elements projecting away from the baseplate and holding lugs located opposite the baseplate. In this case, the carrier is arranged in such a way that it can be pivoted, together with its baseplate, between the limbs of the unshaped base element. Accommodated in the limbs of the base element is a locking device, which has mutually opposite latching tabs which can engage in corresponding lateral recesses in the mobile telephone.

If a telephone is inserted into the quiver-shaped carrier, it stands with its lower end on the supporting faces and is held between the baseplate and the holding lugs. As soon as the mobile telephone is then pivoted, together with the carrier, in between the limbs of the unshaped base element, the latching tabs provided thereon latch in. By actuating an appropriate release push button, the mobile telephone is released once more and pivoted upwards by the spring-biased carrier.

In the case of this known holder, the mobile telephone is held between a multiplicity of holding elements, but these cannot prevent the mobile telephone carrying out oscillations relative to the holding device in the known holding device, and in so doing rubbing on the holding elements, which leads to unsightly traces of use.

SUMMARY OF THE INVENTION

Proceeding from this, the invention is based on the object of providing a further holding device for a communications unit, which has improved operational safety and is highly user-friendly.

A holding device, according to the invention, for a communications unit contains a base element, a carrier which is pivotably articulated on the base element, which can be pivoted away from the base element by means of spring force, and onto which the communications unit can be pushed with its one end against stop means which hold the communications unit, and a locking device which is present on the base element in order to lock the other end of the communications unit when the carrier is pivoted against the base element, the locking device pressing the communications unit against the stop means.

The stop means provided according to the invention, which hold the communications unit in the carrier and which work together with the locking device in such a way that a 3rd fixing of the communications unit in the carrier is achieved, ensure that the surface of the communications unit, that is to say of a mobile telephone, cannot rub on the holder, even in the event of severe vibration. This prevents unsightly traces of use on the surface of the communications unit.

Furthermore, the operational reliability of the holding device according to the invention is increased in particular in that, even when the carrier is pivoted away from the base element, the communications unit remains securely connected to the carrier, until it is removed from the latter, with the result that the communications unit cannot be inadvertently detached from the holding device. This also leads to improved user-friendliness.

According to a refinement of the invention, a compression-spring device is arranged between the base element and a bottom of the carrier. When the locking device is unlocked, the carrier can be pivoted away from the base element by means of this compression-spring device, and with the carrier the communications unit, with the result that the said unit may be removed from the carrier when the latter is in the pivoted state. In this case, the communications unit remains reliably connected to the carrier during the pivoting of the carrier away from the base element, without there being a risk that the said unit is inadvertently detached from the holding device and is damaged or brings about damage. Instead of the compression-spring device, it is also possible for a leg spring, arranged on the pivot axis between the base element and carrier, to be used, by means of which the carrier can likewise be biased in the direction away from the base element. For this purpose, a leaf spring could also be used between carrier and base element.

In order to prevent excessively rapid pivoting of the carrier away from the base element, a damping device can be connected between carrier and base element, which device reduces the pivoting movement of the carrier up to a certain degree.

Particularly reliable and secure holding of the communications unit in the carrier can be achieved if the stop means provided are two stop elements which are spaced apart from each other, transverse to the longitudinal direction and parallel to the main plane of the communications unit, and which preferably engage into recesses provided at the sides in the communications unit.

This allows a broad supporting base for the communications unit to be provided, which can in particular be designed such that, even given intense vibration, the communications unit is reliably held in the carrier, even when it is located in the position pivoted upwards.

According to another refinement of the invention, at least the bottom of the carrier extends as far as close to the locking device, so that in any pivoted position of the carrier, secure holding of the communications unit connected to it is ensured. In a development of the invention, side walls of the carrier, which run in the direction of the locking device, engage partly around the communications unit. This ensures even more reliable holding of the communications unit in the carrier. For example, free longitudinal edges of the side walls can come to lie on the communications unit, with the result that even its surface facing away from the carrier is gripped. In addition, the side walls may be provided with inwardly pointing longitudinal strips, in order to achieve even better fixing or holding of the communications unit on the carrier.

According to another refinement of the invention, free longitudinal edges of the side walls engage in lateral longitudinal slots in the communications unit, which leads to a relatively flat overall construction of the holding device, since the walls of the carrier now no longer come to lie above the communications unit.

The height of the side walls themselves can reduce in the direction towards the free end of the carrier bottom, which makes it more easily possible to connect the communications unit to the carrier or to remove the communications unit from the carrier.

In yet another refinement of the invention, one end wall of the carrier may have an opening running as far as its free edge, this end wall generally being used to form a delimitation when the communications unit is placed on the carrier. However, it is possible for a cable connection to be led through the opening, the said cable being connected to that end of the communications unit with which the latter points to the carrier. Since the opening extends as far as the free edge of the said front wall, the communications unit can easily be removed from the carrier without having to detach the cable connection.

According to another advantageous development of the invention, the carrier comprises at least the carrier bottom, on whose sides facing away from the base element there is arranged a dovetail-shaped strip extending in the direction of the locking device. When the communications unit is pushed onto the carrier, this dovetail-shaped strip then engages in a correspondingly fitting longitudinal opening on the underside of the communications unit, with the result that the communications unit and carrier can be connected to each other securely. In order to limit the longitudinal movement of the communications unit relative to the carrier, the longitudinal opening, accepting the dovetail-shaped strip, on the underside of the communications unit can be limited in its length.

The base element may advantageously have, in the region of the locking device, a rest for the other end of the communications unit, with the result that, when the carrier is being pivoted towards the base element, the communications unit is moved with its free end against a stop face, in order to ensure secure locking. The locking device can in this case have a spring-biased latching tab which, when the carrier and communications unit have been pivoted completely towards the base element, engages in an end opening in the communications unit and therefore holds the latter securely.

In this case, it is particularly advantageous if the latching tab engages in a latching recess in the end of the communications unit, with the result that the latching tab, together with the stop elements, forms a 3rd holder for the communications unit.

In this case, it is particularly advantageous that the communications unit has, at least in the region of the carrier, no further contact with the holding device apart from the stop blocks serving as stop means. In the region of the latching tab, too, additional contact points with the holding device can largely be avoided. In particular, the stop face for the communications unit in the region of the locking device can be designed such that it is used only for the alignment of the communications unit with respect to the latching tab, while the communications device, after the latching tab has engaged in a corresponding opening, is lifted slightly off the rest, so that it continues to be held only by the latching tab.

With the aid of an unlocking knob provided on the locking device, it is possible for the latching tab to be actuated, in order to be guided out of the said end opening in the communications unit. The carrier can then be pivoted away from the base element and, with it, the communications unit, which can then be removed from the carrier.

According to a particular refinement of the invention, the carrier, may hold a plug-in connector to produce at least one electrical connection between itself and the communications unit. As soon as the communications unit has reached its end position in the carrier, there is an electrical contact between the plug-in connector and communications unit. In this case, the plug-in connector is, for example, pushed into the end of the communications unit. Via this plug-in connector, it is then possible for a supply voltage to be transmitted to the communications unit and, likewise, for an antenna connection to be connected to it. If the communications unit is a mobile telephone, it can be continuously recharged and kept in contact with the antenna connection. Data are normally obtained via the antenna cable, and may also be transmitted via the charging cable to a device other than the telephone.

In this case, the plug-in connector can be connected via a cable to a connection on the holding device, via which easy access to the supply potential and to the antenna is possible. The connection itself is then connected via further lines to a supply potential and the antenna, respectively, these lines being laid during the installation of the holding device.

The holding device itself can, for example, be installed in a motor vehicle, for example in the region of the armrest or central console, so that the antenna connection is then connected to the motor vehicle antenna, while the charging potential can be taken from a charging station present in the motor vehicle.

According to a further refinement of the invention, the holding device may also have an electrical connection, to which the communications unit is permanently connected via a cable. The communications unit may in this case be, for example, a handset which is connected via the cable to a transceiver station arranged remote from the holding device. In the case of a motor vehicle, this transceiver station could be located anywhere in the motor vehicle, for example in the boot. The cable would then be used only to exchange information with the permanent installation.

If a communications unit, for example a mobile telephone, is intended to be connected not only to an antenna and a more powerful voltage supply, for example a motor vehicle battery, but also to a functional device, such as for example a hands-free system, then it particularly advantageous if there is provided on the base element a switching means which, depending on the position of a communications unit arranged in the carrier, switches on or off a functional device that is connected to the communications unit via the cable. In this case, the switching means used can be a switch which is arranged in the holding device and is acted upon either by a switching pin on the carrier or by the locking device. In the latter case, it is particularly expedient if the locking device has a lever that can be pivoted jointly with the latching tab and actuates a switch.

BRIEF DESCRIPTION OF THE DRAWINGS

Exemplary embodiments of the invention are explained in detail below with reference to the drawing, in which.

In the various figures of the drawing, mutually corresponding parts are provided with identical reference symbols.

DETAILED DESCRIPTION OF THE PREFERRED EMBODIMENT

Figure 6:
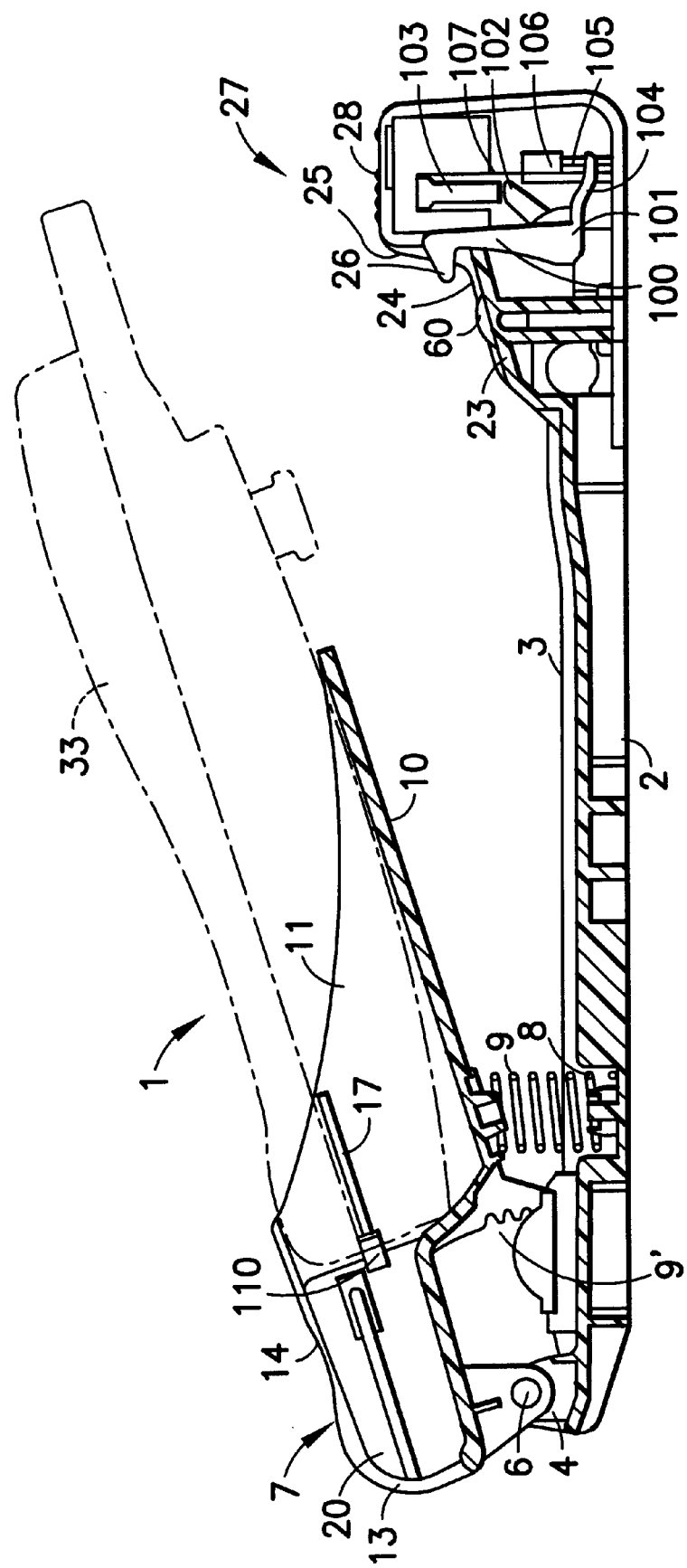
FIG. 6 shows a longitudinal section through the holding device according to the invention with the carrier pivoted up.
Figure 7:
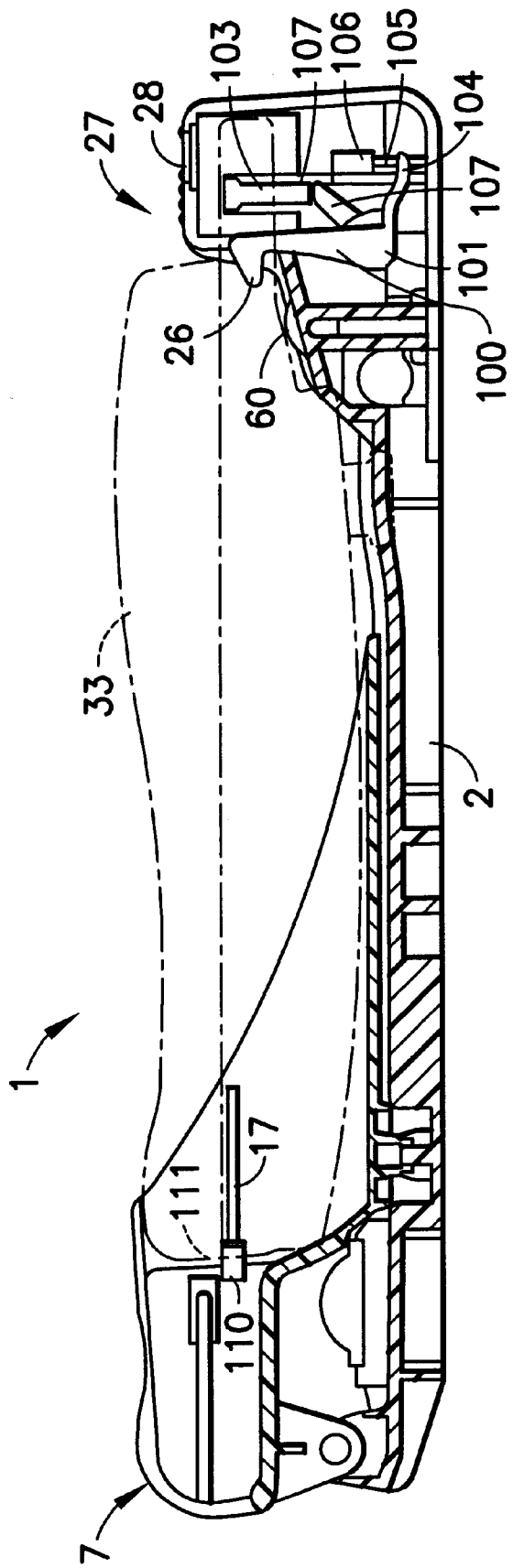
FIG. 7 shows a longitudinal section through the holding device according to the invention with the carrier pivoted down.

A longitudinal section through the holding device 1 according to the invention is illustrated in FIGS. 6 and 7. This holding device 1 comprises an essentially plate-like base element 2 which, for example, may be fastened on the central console of a motor vehicle or in the armrest region. For this, suitable fastening means are provided, which are not illustrated in detail.

The base element 2 is of rectangular design and, on its surface 3 and in the region of its left end in FIG. 6, carries two bearing blocks 4 and 5, arranged at a distance from each other, to support aligning pivots 6, which are located parallel to the front edge of the base element 2 and are connected to a carrier 7, which can be pivoted about these pivots 6. The two aligning pivots 6 or pivoting axle stubs can also be replaced by a single continuous pivot axle. The carrier 7 in this case comes to lie above the surface 3 of the base element 2 and, starting from the pivots 6, extends in the direction towards the other end face of the base element 2.

In the surface 3 of the base element 2, and underneath the carrier 7, there is an opening 8 for the suitable accommodation of one end of a compression spring 9. This compression spring 9 is thus supported on the base element 2 and, with its other end, presses against the underside of a bottom 10 of the carrier 7. In order to prevent slipping of the compression spring 9 in this region, there may be on the underside of the carrier bottom 10 a corresponding projection, which engages in the compression spring 9, which in this case is wound in a helix. The compression spring 9 thus endeavours to press the carrier 9 continuously away from the base element 2, that is to say in the anti-clockwise direction about the axis 6 in FIG. 6.

In order to achieve the same effect, the compression spring 9 could also be replaced by a spring arrangement (leg spring) wound in a helix, which rests on the pivoting axis or pivots 6 and is supported with one end on the base element 2 and with the other end on the carrier 7. The compression spring 9 is advantageously assigned a damping device 9', which ensures a uniform pivoting movement of the carrier 7.

The carrier 7 is designed like a shovel and has two side walls 11 and 12, which proceed from the side edges of the carrier bottom 10, extend in the longitudinal direction of the base element 2 and run virtually perpendicular to the carrier bottom 10. These side walls 11 and 12 are connected to each other in the region of the pivots 6 via an end wall region 13 of the carrier 7. The free longitudinal edges 14 and 15 of the side walls 11 and 12 are in addition bent over towards each other above a predefined distance from the base surface 10, a still greater distance remaining between them, however.

These free longitudinal edges 14 and 15 merge, in the direction towards the rear end of the carrier 7, into an opening 16 in the end wall region 13, which extends as far as close to the bottom 10 of the carrier 7. Viewed in the direction towards the free end of the carrier 7, on the other hand, the height of the side walls 11 and 12 decreases continuously. Not least, there are also on the inner sides of the side walls 11 and 12 guide strips 17 and 18 that are connected to the latter, for example in one piece, and run parallel to the carrier bottom 10.

There is a plug-in connector 19 in the carrier 7. This plug-in connector 19 is inserted into the carrier 7 through the open end of the latter and pushed as far as the rear carrier region, so that it strikes against the end wall region 13 and is held by the side walls 11 and 12 and, respectively, thickened inner projections 20 on the side walls 11, 12. Between the side walls of the plug-in connector 19 and the thickened inner projections 20 it is possible for there to be a type of tongue and groove connection, in order to secure the height of the plug-in connector 19 in the carrier 7. At the lower end of the plug-in connector 19, on the left in FIG. 1, the said connector is permanently connected to a cable 21, which projects out of the carrier 7 through the opening 16 when the plug-in connector 19 is inserted into the carrier 7. With its other end, the cable 21 is fastened to a connection contacting device, which is located in the region of the other end of the base element 2, as will be explained later. At the upper side of the plug-in connector 19, there projects from the latter a connection contact strip 22, onto which a connection socket of the communications unit is pushed when the communications unit is inserted into the carrier 7.

Figure 2:
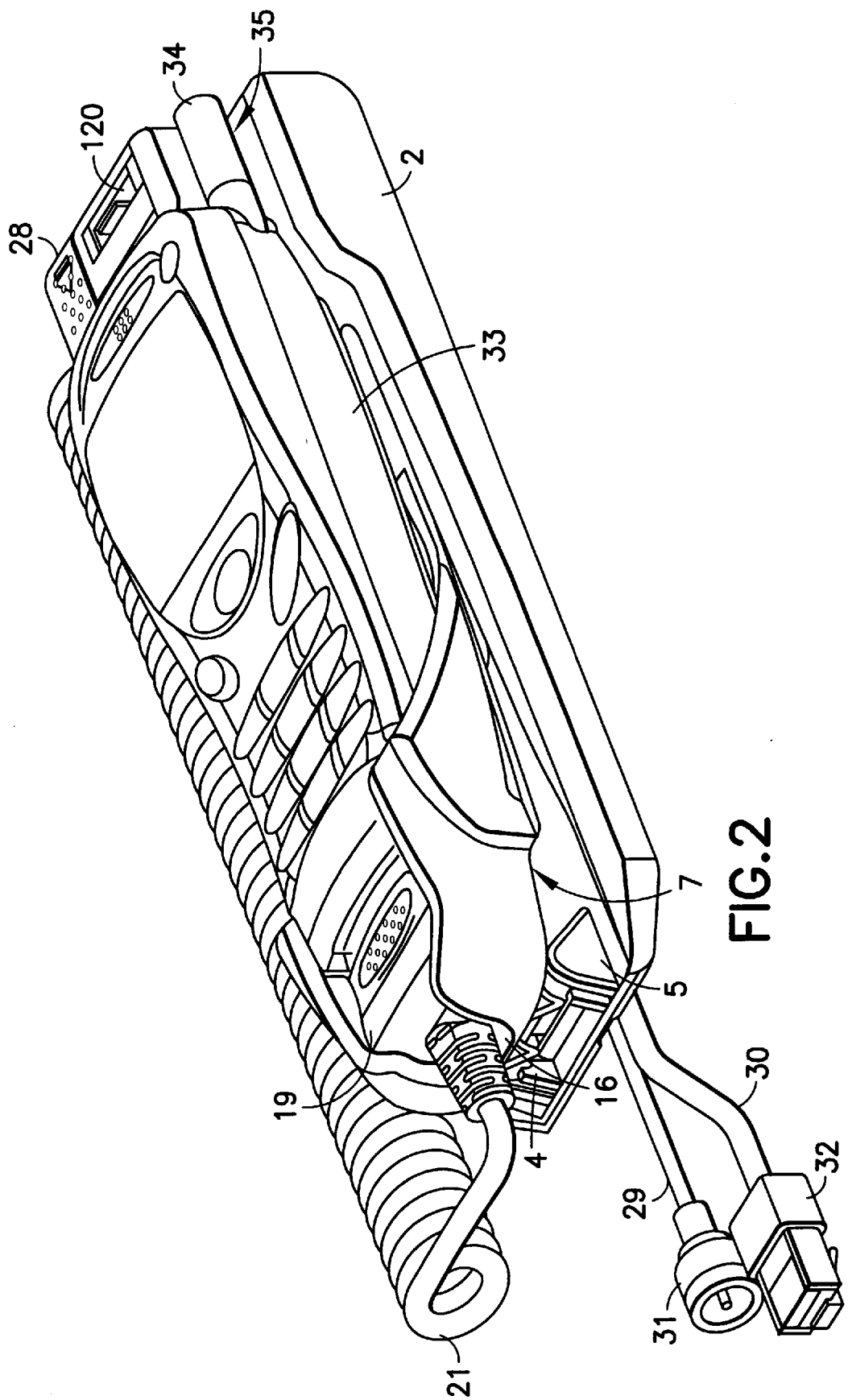
FIG. 2 shows a holding device according to FIG. 1 with the carrier pivoted down and with a mobile telephone.

As has already been mentioned at the beginning, the communications unit may be a mobile telephone, as is shown in FIG. 2. If the mobile telephone is inserted with its lower end into the carrier 7, in the final state the connection contact strip 22 projects into the connection socket of the mobile telephone, which is located on the lower end of the mobile telephone.

Figure 1:
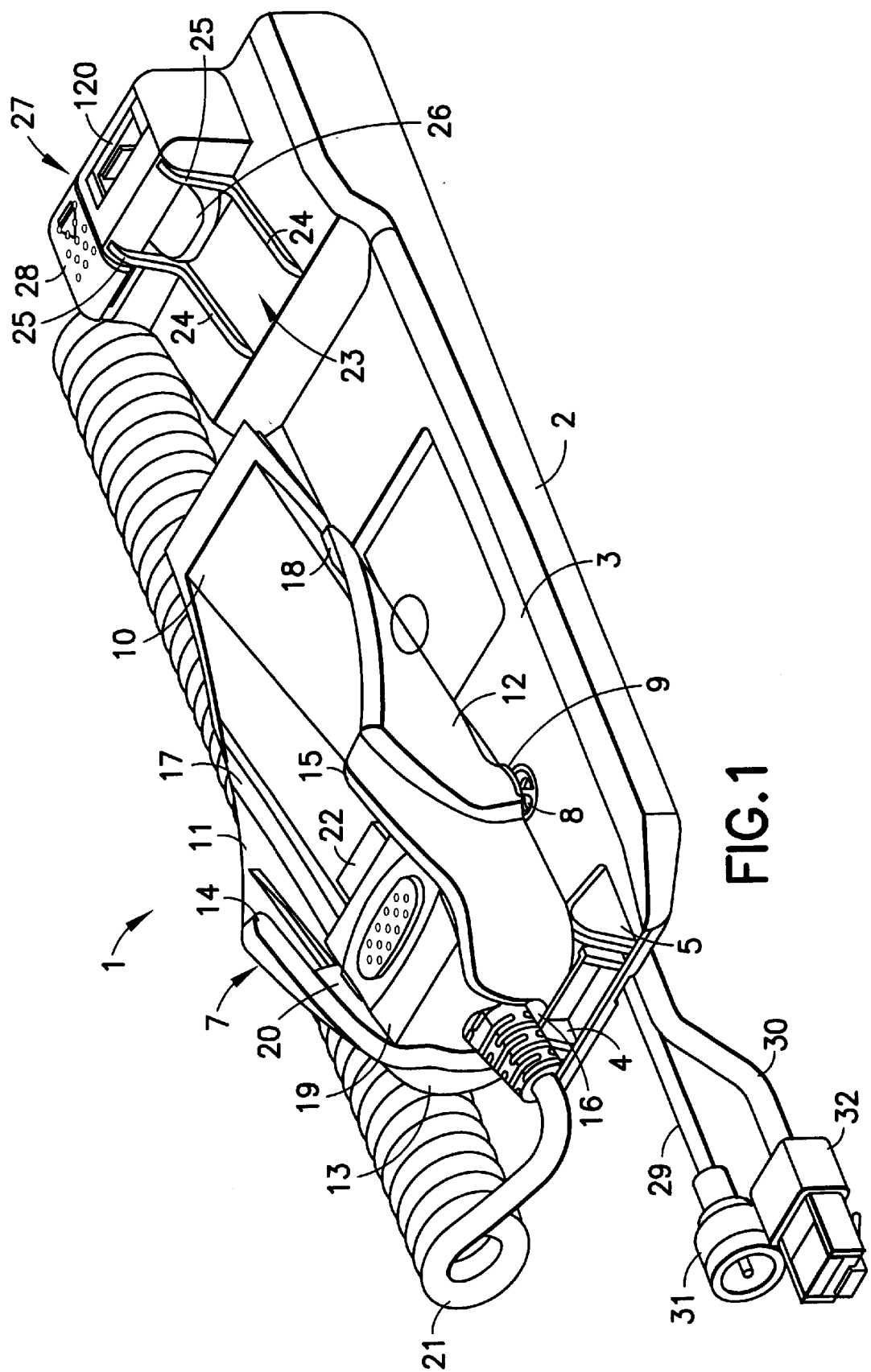
FIG. 1 shows a holding device according to the invention with the carrier pivoted up, without a mobile telephone.

According to FIGS. 1, 6 and 7, the holding device 1 has, on the end of the base element 2 that is on the right in FIG. 1, a rest 23 for the mobile telephone inserted into the carrier 7. This rest 23 comprises two angular brackets, located at a distance from each other and each having horizontal and vertical limbs 24 and 25. The horizontal limbs 24 serve to support the rear wall of the mobile telephone in its upper region, whereas the vertical limbs 25 serve to guide the upper end wall of the mobile telephone.

In the region between the vertical limbs 25 there is a latching tab 26 of a locking device 27, to which an unlocking knob 28 also belongs. The latching tab 26 is biased by spring force in such a way that it projects continuously beyond the vertical limbs 25 in the direction of the carrier 7, and when the mobile telephone is present in the carrier 7, engages in a latching opening on the upper end of the latter, when the rear wall of the mobile telephone comes to lie on the horizontal limb 24. By pressing the unlocking knob 28 down, the latching tab 26 is guided back counter to the spring force, so that it releases the mobile telephone.

The latching tab 26 is fitted to a pivotable lever 100, which can be pivoted about an axis 101. In order to be able to pivot the latching tab 26 to the right in FIG. 6 counter to the spring force biasing it, an actuating lever 102 is provided, which is connected to the lever 100 and, when the unlocking knob 28 is pressed down, is pressed down via a pin 103 fitted to the latter and, at the same time, makes possible a pivoting movement of the lever 100 to the right in FIG. 6, with the result that the latching tab 26 is moved into a release position.

Connected to the lever 100 fitted with the latching tab 26 is a further lever 104, in order to execute with the latter a joint pivoting movement. The further lever 104 interacts with an actuating pin 105 of a switch 106, in order to switch the switch 106 on and off.

The switch 106 is in this case mounted, for example, on a printed circuit board or circuit board 107, which has an appropriate circuit in order to connect a mobile telephone to a hands-free system.

As has already been mentioned, in the simplest case there is, at the same end of the base element 2 at which the locking device 27 is also present, only the contacting device for the cable 21. There, the cable 21 is permanently connected or soldered to the contacting device. Furthermore, in the present case two further cables are permanently connected to the contacting device and they are led out of the holding device 1 at a suitable point, in order to be able to connect the holding device 1 electrically to further devices. These are, in particular, an antenna cable 29 and a charging cable 30. The two cables 29, 30 are connected at their free ends using suitable plugs 31, 32. If the mobile telephone is inserted into the carrier 7, it can be connected via the connection contact strip 22, the cable 21 and the cable 29 to an antenna connection, for example to a motor vehicle antenna. In addition, the cable 21 and the cable 30 can be connected via the connection contact strip 22 to a charging station, which can be located anywhere in the vehicle.

In the preferred exemplary embodiment, the contacting device for connecting the cable 21 to the cables 29, 30 is assigned the circuit arranged on the circuit board 107, the cables 21 and 30 having appropriate lines in order to connect the mobile telephone to the hands-free system, which is connected or disconnected via the circuit on the circuit board 107, depending on the position of the switch 106.

Lastly, a locking device may advantageously also be present directly between the base element 2 and carrier 7, in order then also to be able to lock the carrier 7 in its position pivoted towards the base element 2, when there is no mobile telephone or handset in the carrier. This locking device between base element 2 and carrier 7 may be a so-called push-push locking device, which when the carrier 7 is first pushed against the base plate 2 holds the said carrier on the baseplate, and releases it on the second push.

FIG. 2 shows the holding device according to FIG. 1 with the mobile telephone 33 inserted, said telephone being locked to the base element 2 by means of the locking device 27. The latching tab 26 now engages in the end upper opening of the mobile telephone 33, while at the same time a compression spring 9 is biased to a maximum by the carrier 7 being pivoted downwards. By means of the spring-biased latching tab 26 of the locking device 27, the mobile telephone inserted into the carrier 7 is pressed against stop blocks 110, which engage in corresponding recesses 111 (see also FIG. 10) in the lower end of the mobile telephone 33. Whilst the end upper opening of the mobile telephone 33, in which the latching tab 26 engages, is preferably arranged in the centre, the end lower recesses 111 are arranged at the sides. This thus results in a reliable 3rd holder for the mobile telephone 33 in the holding device 1, which makes it possible to hold the mobile telephone 33 in the carrier 7 in such a way that it is held therein with a spacing from the bottom 10 and from the side walls 11, 12.

As a result of the 3rd holder described, in which the mobile telephone is pressed by the latching tab 26 against the stop blocks 110, it is ensured that, even in the event of severe vibration in the vehicle, the surface of the mobile telephone cannot rub on the holding device 1. This avoids the wear on the surface of the mobile telephone, which would otherwise lead to undesired traces of use.

Furthermore, the stop blocks 110 and the recesses 111 accommodating these on the mobile telephone 33 are designed in such a way that as soon as the mobile telephone 33 is inserted into the carrier 7 the mobile telephone 33 is held reliably in the carrier 7 as a result of the support on the stop blocks.

If the unlocking knob 28 is pressed downwards, that is to say in the direction towards the base element 2, the latching tab 26 releases the mobile telephone 33, so that the compression spring 9 can then press the carrier 7, and with it the mobile telephone 33, upwards and away from the base element 2. In order not to allow this pivoting movement to proceed too rapidly, the movement damping element 9', preferably an oil damper, is further provided between carrier 7 and base element 2. The said damper permits the pivoting movement of the carrier 7 to be controlled in such a way that this movement is performed, for example, rapidly at the start and more slowly in the direction of the pivoted end position.

If, therefore, the mobile telephone 33 is held in the position shown in FIGS. 2 and 7, the latching tab 26 is held in a position in which it holds the actuating lever 104 away from the pin 105 of the switch 106, with the result that the hands-free system is switched on. As soon as the mobile telephone 33 is released by actuating the unlocking knob 28, and pivots upwards, the latching tab 26 is automatically tilted a little to the left and at the same time the lever 104 is pressed upwards against the pin 105 of the switch 106. The switch 106 then switches from the hands-free system to the acoustic devices of the mobile telephone 33, so that the user can telephone directly via the mobile telephone 33.

It should also be pointed out that it is also possible to allow the guide strips 17 and 18 to engage in corresponding lateral longitudinal slits in the mobile telephone 33 at its lower end, so that the mobile telephone 33 is even more securely guided and additionally held when being inserted into the holder. Overall, the carrier 7 is configured in such a way that when the mobile telephone 33 is inserted, the latter is then also reliably positioned by the carrier 7 when the latter is located in its position pivoted furthest away from the base element 2. Shocks, such as occurred for example during the travel of the motor vehicle, can thus no longer lead to the mobile telephone 33 falling out of the carrier 7 when the latter is pivoted away from the base element 2.

It should also be mentioned that there is sufficient space alongside the locking device 27 for an antenna 34 projecting out of the mobile telephone 33. Appropriate space may be created by means of a suitable recess 35 in the base element 2.

Furthermore, it should also be pointed out that a plug-in device 120 is provided at the right end of the holding device 1, alongside the unlocking knob 28 of the locking device 27, in order to produce a connection via the cable 21 and the plug 22 between the mobile telephone 33 and, for example, a laptop, so that data communication can be carried out via the mobile telephone.

Figure 3:
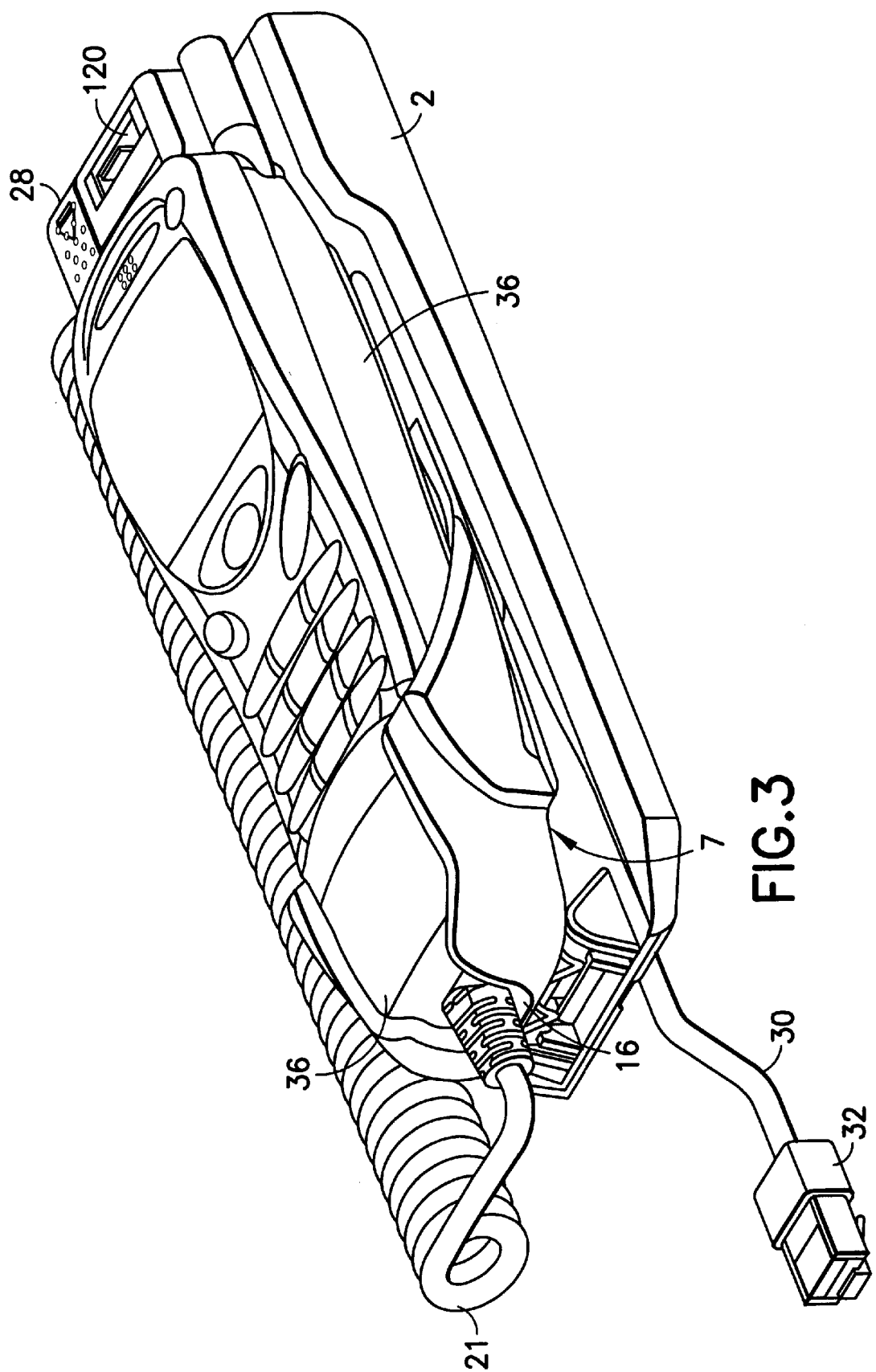
FIG. 3 shows another holding device according to the invention with the carrier pivoted down and with a handset, accommodated by it, of a mobile telephone system comprising handset and fixed station.

FIG. 3 shows a holding device 1 for a handset 36 for a mobile radio system comprising handset 36 and fixed station. For use in a motor vehicle, the fixed station may be present at a different suitable point in the motor vehicle, and contain the necessary transmitting/receiving devices. The handset 36 is then permanently connected at its lower end directly to the cable 21, which is connected to the already mentioned contacting device at the upper end of the base element 2, only one cable 30 now proceeding from this contacting device, and being able to be connected to the fixed station. This cable 30 and the cable 21 then serve only for the transmission of information between the handset 36 and the fixed station.

Otherwise, elements identical to those in FIGS. 1 and 2 are provided with the same reference symbols and will not be described again.

In FIG. 3, what differs from FIG. 1 is only the fact that the handset 36 has at its lower end a shape which corresponds to the outer shape of the plug-in connector 19. In the other outer regions, mobile telephone 33 and handset 36 are of identical design, so that the same carrier 7 and the same base element 2 can be used for them.

Figure 4A:
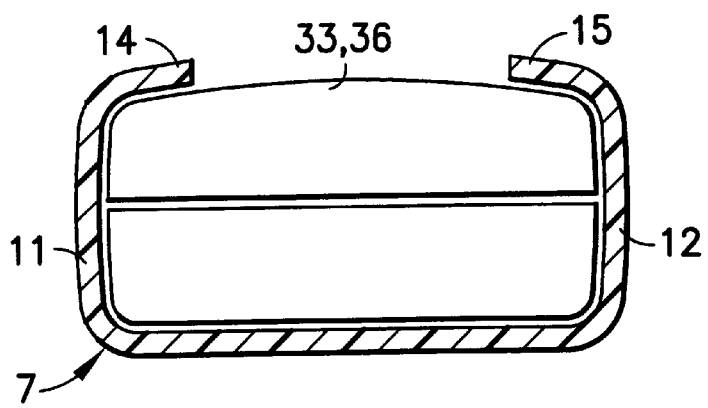
FIGS. 4a to 4c show different cross-sections through the carrier, perpendicular to its longitudinal direction.
Figure 4B:
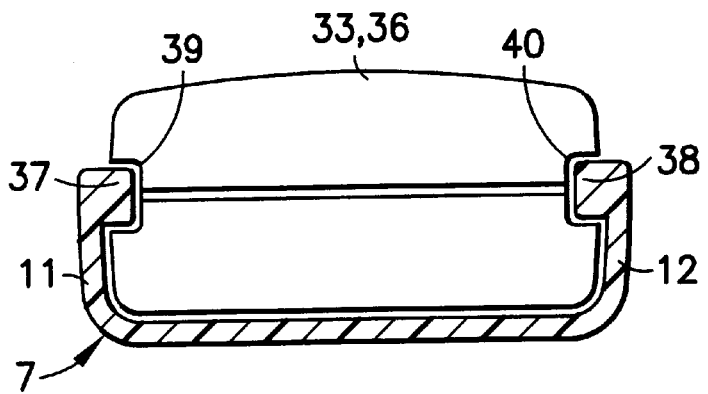
Figure 4C:
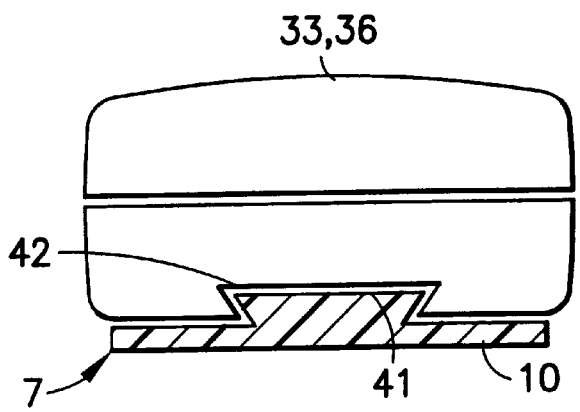

FIGS. 4a to 4c show various cross-sectional shapes of carrier 7 and mobile telephone 33 or handset 36.

According to FIG. 4a, upper longitudinal edges 14, 15 on the side walls 11, 12 of the carrier 7 further grip the mobile telephone 33 or the handset 36.

In FIG. 4b, by contrast, the side walls 11, 12 are not designed to be so high, and instead have inwardly pointing projections 37, 38 on their upper longitudinal edges. These projections engage in corresponding longitudinal grooves 39, 40 on the side walls of mobile telephone 33 or handset 36, in order to ensure a reliable hold. It is advantageous that in this case the carrier 7 has a low height. In the case of this configuration, instead of the stop blocks 110 described, the free ends of the projections 37, 38 serve as stop means for holding the mobile telephone 33 or the handset 36.

In the case of the exemplary embodiment according to FIG. 4c, the carrier 7 has no longitudinal sides, but comprises only the carrier bottom 10 and a dovetail-shaped strip 41 that is present on the upper bottom face and runs in the longitudinal direction of the carrier bottom 10 and centrally in relation to the latter. Provided on the rear main face of the mobile telephone 33 or of the handset 36 is then a longitudinal groove 42 that is suitable for the dovetail-shaped strip 41, the said groove likewise extending in the longitudinal direction of the mobile telephone 33 or of the handset 36. In this case, the end of the strip 41 can serve as stop and holding means. In this case, it is advantageous that a significantly narrower carrier 7 is obtained, since the side walls are dispensed with.

Figure 5:
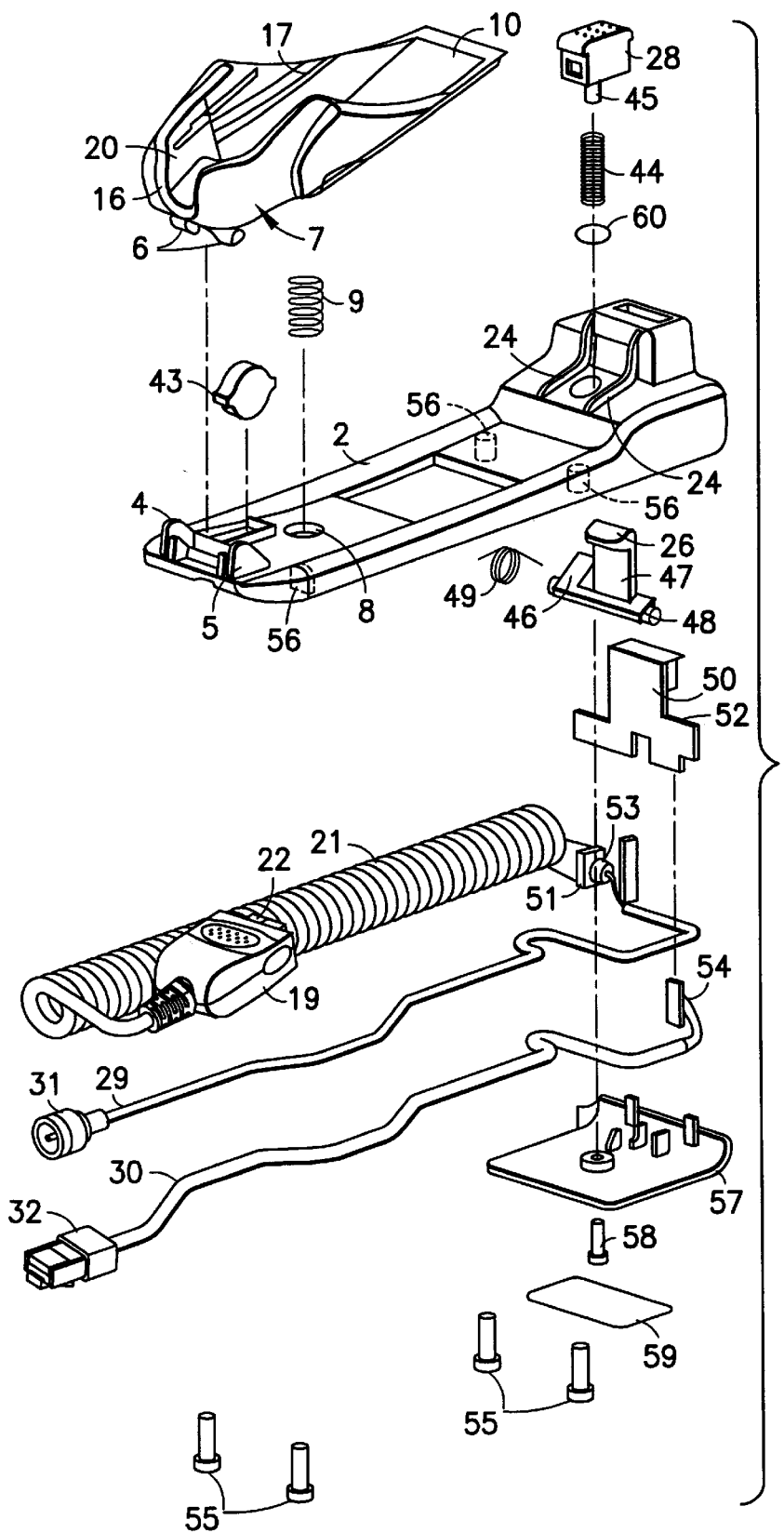
FIG. 5 shows an exploded illustration of the holding device.

Shown in FIG. 5 is an exploded illustration of the holding device according to FIG. 1. Here, too, once more the same elements are provided with the same reference symbols, so that they are not described again.

In addition, it is further possible to see in FIG. 5 an oil damper 43 as a damping device for the control of the movement of the carrier 7. It comes to lie between base element 2 and carrier 7 and is connected to both elements in a suitable way.

Further to be seen in FIG. 5 is a spring 44, which continuously presses the unlocking knob 28 secured to the base element 2 upwards and, via an projection 45, engages on the lower face of the unlocking knob 28. When the unlocking knob 28 is pressed down, the projection 45 strikes against an oblique face 46, located for example at 45° to its longitudinal direction, of a holding element 47 that is connected in one piece to the latching tab 26. This holding element 47 can be pivoted about an axle 48, on which there is seated a spiral spring 49, by means of which the latching tab 26 or-the holding element 47 is biased in the direction towards the carrier 7, in the anti-clockwise direction in FIG. 5. In this case, the oblique face 46 runs in such a way that when it is loaded by the downwardly pointing projection 45, the holding element 47 is rotated about its axis of rotation 48 in the clockwise direction in FIG. 5. The latching tab 26 thus moves away from the carrier 7.

A damping cushion 60 comes to lie between the horizontal limbs 24 of the rest 23, and serves for the vibration-free positioning of the mobile telephone or handset on the base element 2.

The contacting device, already mentioned several times, for the cable 21 is located in the region of the base element 2, behind the locking device, and has a printed circuit board or connection board 50, to which a connection contact 51 for the antenna cable 29 and a connection contact 52 for the charging cable 30 are fastened. In this case, the antenna cable 29 is connected to the connection contact 51 via a plug 53, while the charging cable is connected to the connection contact 52 via a plug 54.

The base element 2 may be fastened to a support with the aid of screws 55, it being possible for this purpose to screw the screws 55 into suitable threaded blind holes 56, which are located on the bottom face of the base element 2.

The space, within the base element 2, that accommodates the locking device and the contacting device is closed at the bottom by a covering plate 57, which may be secured to the base element 2 by means of a screw 58. For its part, the screw 58 can be secured against falling out by a nameplate 59.

Figure 8:
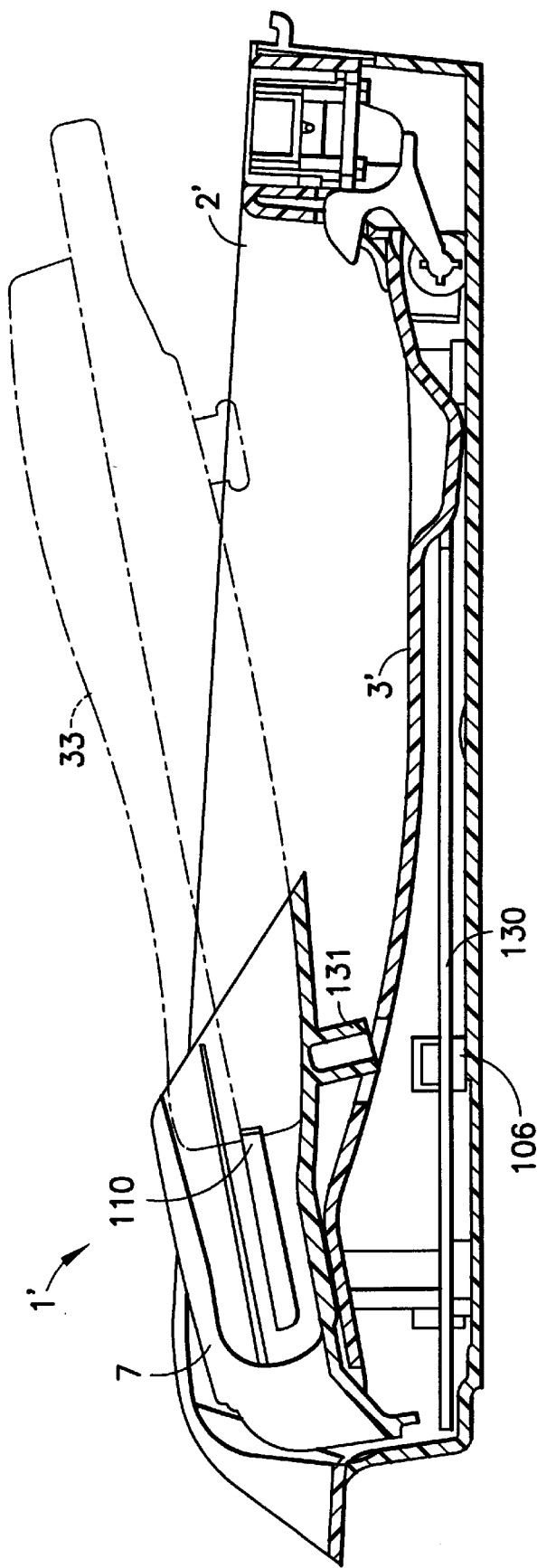
FIG. 8 shows a longitudinal section through a further holding device according to the invention with the carrier pivoted up.
Figure 9:
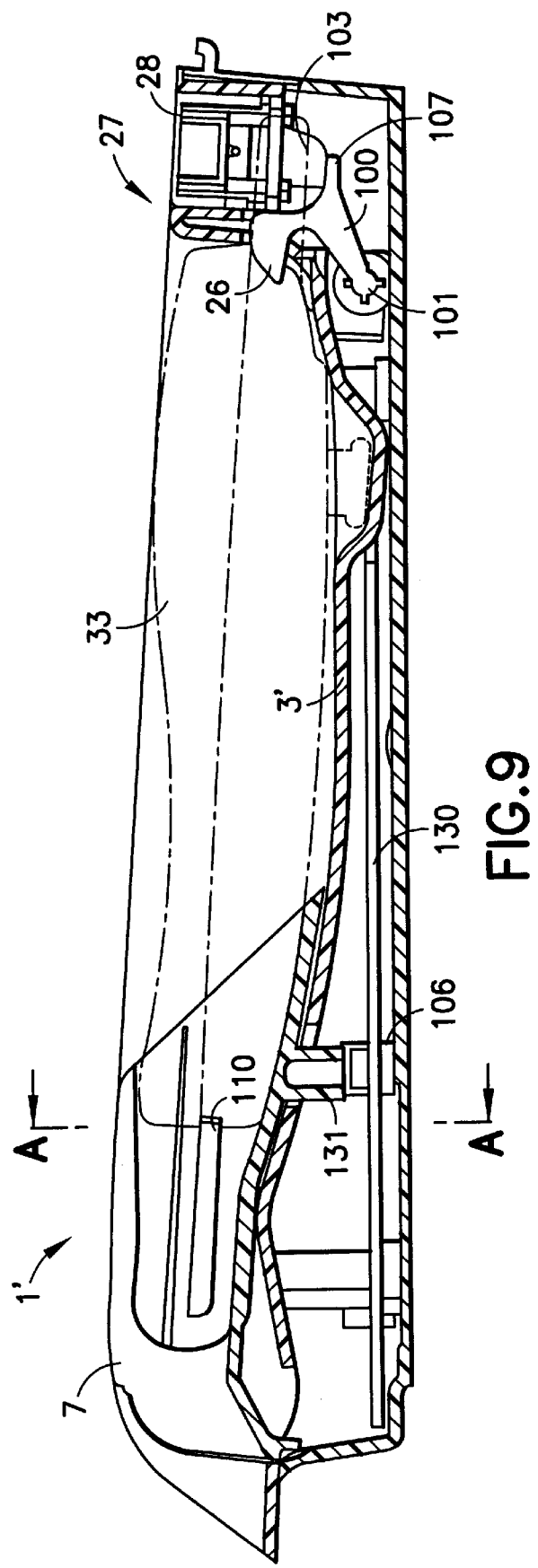
FIG. 9 shows a longitudinal section through the holding device according to FIG. 8 with the carrier pivoted down.

Illustrated in FIGS. 8 and 9 is a further holding device 1' in which the base element 2' is designed with a trough shape. The carrier 7 is pivotably fitted to the base element 2' in a manner not illustrated in more detail, and is biased by means of a suitable spring arrangement into its position pivoted upwards relative to the base element 2' (see FIG. 8). In order to hold the mobile telephone in the carrier 7, stop blocks 110 are provided, which engage in corresponding recesses 111 (see FIG. 10), which are designed at the sides on the lower front end of the mobile telephone 33.

In order to hold a mobile telephone 33 that is inserted into the holder 7 in the pivoted-in position shown in FIG. 9, a locking device 27 is provided which, as already described above, has a latching tab 26, with which the mobile telephone 33 is firmly biased against the holding blocks 110, in order to obtain a secure 3rd fixing, which prevents the surface of the mobile telephone 33 rubbing on parts of the holding device 1'.

In this case, it is particularly advantageous if, as also in the case of the holding device 1 described above, with the exception of the stop blocks 110 a spacing or interspace is provided between the elements of the carrier 7 surrounding the mobile telephone 33 and the surface of the mobile telephone 33 inserted into the carrier 7.

Figure 10:
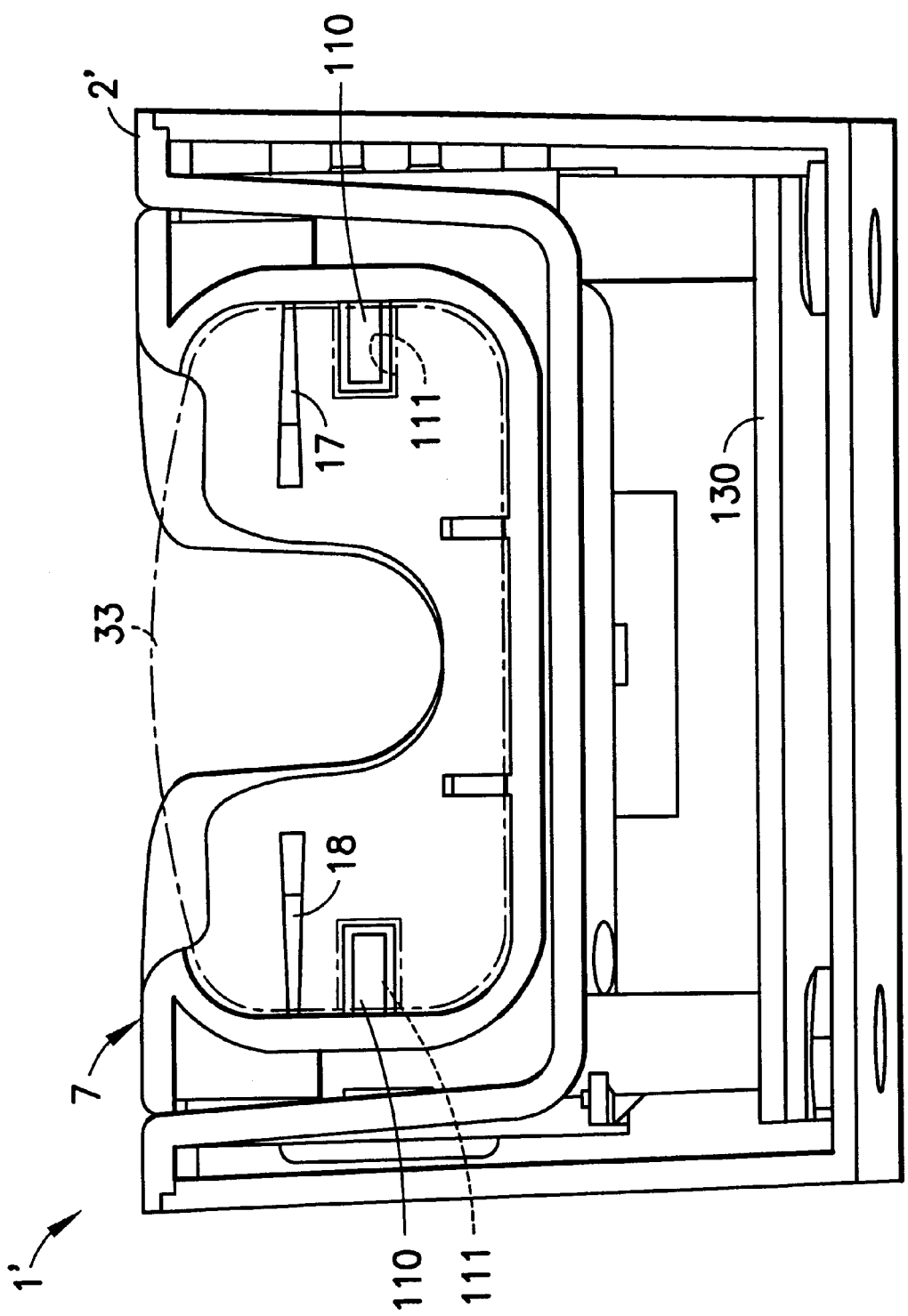
FIG. 10 shows a section essentially along the line A—A in FIG. 9.

In the holding device 1' illustrated in FIGS. 8, 9 and 10, there is arranged underneath a bottom shell 3' a printed circuit board 130, on which, for example, charging electronics for a rechargeable battery of the mobile telephone 33 are arranged. In addition, there is also fitted on the printed circuit board 130 a switch 106, which produces or interrupts the connection of the mobile telephone 33 to a hands-free telephone system in a vehicle. To this end, the hands-free system, which consists for example of a microphone fitted in the region of the dashboard or sun visor and of a loudspeaker, is connected in a suitable way to the switch 106 on the printed circuit board 130. In addition to the switch, in this case it is also possible for an appropriate interface circuit to be provided.

If the carrier 7 is in the upwardly pivoted position shown in FIG. 8, a pin 131 fitted to the carrier 7 is out of engagement with the switch 106, and the hands-free system is disconnected, irrespective of whether a mobile telephone 33 is inserted into the carrier 7 or not.

Following the insertion of a mobile telephone 33 into the carrier 7, as soon as the mobile telephone is moved with the carrier into the pivoted-in position shown in FIG. 9, the pin 131 comes into engagement with the switch 106 and actuates the latter in such a way that the mobile telephone 33 is connected to the hands-free system. Following the actuation of the unlocking knob 28, as soon as the latching tab 26 has moved out of the corresponding opening in the upper end of the mobile telephone 33, and the carrier 7 moves the mobile telephone 33 back once more into the position illustrated in FIG. 8, the hands-free system is also disconnected once more, since the pin 131 releases the switch 106.

What is claimed is:

1. Holding device (1) for a communications unit (33, 36), having
   a base element (2);
   a carrier (7) which is articulated pivotally on the base element (2) so that said carrier can be pivoted away from the base element(2), by means of a spring force, said carrier being adapted to receive the communications unit (33, 36) with one end against stop elements (110) which engage laterally in corresponding recesses (111) in the communications unit (33, 36) so as to hold the communications unit (33, 36) reliably as soon as the communications unit (33, 36) is inserted into the carrier (7); and
   a locking device (27) which is present on the base element (2) in order to lock the other end of the communications unit (33, 36) when the carrier (7) is pivoted towards the base element (2), the locking element (27) pressing the communications unit (33, 36) against the stop means (110);
   characterized in that the carrier (7) is fitted with a plug-in connector (19) to produce at least one electrical connection between it and the communications unit (33), the plug-in connector including a plug (22) adapted to be mated to the communications unit when the communications unit is inserted into the carrier (7), the carrier (7) including a guide strip (17, 18) on each of an inner sidewall of carrier (7), the guide strips being adapted to engage a corresponding lateral longitudinal slit in a lower end of the communications unit and guide the communications unit into the carrier (7) so that the plug (22) is smoothly and reliably inserted into a respective counterpart provided on a bottom on the communications unit.

2. Holding device according to claim 1, characterized in that a compression-spring device (9) is arranged between the base element (2) and a bottom (10) of the carrier (7).

3. Holding device according to claim 1, characterized in that the compression-spring device (9) is assigned a damping device (9', 43), which damps the pivoting movement of the carrier (7).

4. Holding device according to claim 1, characterized in that the stop means provided are two stop elements (110) that are spaced apart from each other, transverse to the longitudinal direction and parallel to the main plane of the communications unit (33, 36).

5. Holding device according to claim 1, characterized in that side walls (11, 12) of the carrier (7), which run in the direction of the locking device (27), engage only partly around the communications unit (33, 36), an interspace preferably being provided in each case between the side walls (11, 12) of the carrier (7) and the communications unit (33, 36).

6. Holding device according to claim 5, characterized in that free longitudinal edges (14, 15) of the side walls (11, 12) come to lie above the communications unit (33, 36).

7. Holding device according to claim 6, characterized in that the side walls (11, 12) are provided with inwardly pointing longitudinal strips (17, 18).

8. Holding device according to claim 5, characterized in that free longitudinal edges (14, 15; 37, 38) of the side walls (11, 12) grip in lateral longitudinal slots (39, 40) in the communications unit (33, 36).

9. Holding device according to claim 5, characterized in that the height of the side walls (11, 12) decreases in the direction towards the free end of the carrier bottom (10).

10. Holding device according to claim 5, characterized in that one front wall (13) of the carrier (7) has an opening (16) running as far as its free edge.

11. Holding device according to claim 1, characterized in that the carrier (7) comprises at least the carrier bottom (10), on whose side facing away from the base element (2) there is arranged a dovetail-shaped strip (41) extending in the direction of the locking device (27).

12. Holding device according to claim 1, characterized in that the base element (2) has, in the region of the locking device (27) a rest (23) for the other end of the communications unit (33, 36).

13. Holding device according to claim 1, characterized in that the locking device (27) has a spring-biased latching tab (26), with the result that it presses the communications unit (33, 36) against the stop means (110).

14. Holding device according to claim 13, characterized in that the latching tab (26) engages in a latching recess in the end of the communications unit (33, 36).

15. Holding device according to either claim 13, characterized in that the latching tab (26) forms, together with the stop elements, a 3rd holder for the communications unit (33, 36).

16. Holding device according to claim 13, characterized in that the locking device (27) is provided with an unlocking knob (28) for actuating the latching tab (26).

17. Holding device according to claim 1, characterized in that the plug-in connector (19) is connected to a connection on the holding device (1) via a cable (21).

18. Holding device according to claim 1, characterized in that the communications unit is a mobile telephone (33).

19. Holding device according to claim 1, characterized in that it has an electrical connection to which the communications unit (36) can be permanently connected via a cable (21).

20. Holding device according to claim 19, characterized in that the communications unit is a handset (36) of a mobile telephone system.

21. Holding device according to claim 17, characterized in that there is provided on the base element (2) a switching means (106) which, depending on the position of a communications unit (33, 36) arranged in the carrier (7), switches on or off a functional device that is connected to the communications unit (33, 36) via the cable (21).

22. Holding device according to claim 21, characterized in that the switching means (106) is a switch (106) that can be actuated by a switching pin (131) on the carrier (7).

23. Holding device according to claim 21, characterized in that the switching means (106) can be acted on by the locking device (27).

24. Holding device according to claim 23, characterized in that the locking device (27) has a lever (104) that can be pivoted jointly with the latching tab (26) and actuates a switch (106).

* * * * *